(12) United States Patent
Reed et al.

(10) Patent No.: US 10,859,695 B2
(45) Date of Patent: Dec. 8, 2020

(54) ACOUSTIC SYSTEM AND METHOD FOR CHARACTERIZING GRANULAR MEDIA

(71) Applicant: The Government of the United States of America, as represented by the Secretary of the Navy, Arlington, VA (US)

(72) Inventors: Allen H. Reed, Bay St. Louis, MS (US); William M. Sanders, New Orelans, LA (US); David C. Young, Long Beach, MS (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 312 days.

(21) Appl. No.: 15/824,711

(22) Filed: Nov. 28, 2017

(65) Prior Publication Data

US 2019/0162847 A1 May 30, 2019

(51) Int. Cl.
*G01S 15/89* (2006.01)
*G01S 15/10* (2006.01)
*G01S 7/539* (2006.01)

(52) U.S. Cl.
CPC ............ *G01S 15/108* (2013.01); *G01S 7/539* (2013.01); *G01S 15/8911* (2013.01);
(Continued)

(58) Field of Classification Search
CPC ............... G01S 15/108; G01S 15/8911; G01S 15/8952; G01S 7/539; G01V 2210/144; G01V 2210/584; G01V 2210/588
See application file for complete search history.

(56) References Cited

U.S. PATENT DOCUMENTS

| 5,452,265 A * | 9/1995 | Corsaro | ................. | H04R 23/00 |
| | | | | 367/152 |
| 5,521,882 A * | 5/1996 | D'Angelo | .............. | G01V 1/303 |
| | | | | 324/335 |

(Continued)

OTHER PUBLICATIONS

Kim et al., "Nonlinear parameter estimation in water-saturated sandy sediment with difference frequency acoustic waves" Ultrasonics 49 (2009) 436-445 (Year: 2009).*

(Continued)

*Primary Examiner* — Krystine E Breier
(74) *Attorney, Agent, or Firm* — US Naval Research Laboratory; William Ladd (57) ABSTRACT

Embodiments relate to noncontact determination of nonlinearities. Initially, a first and second primary signal are preconditioned to produce a first and second tone capable of reaching a target granular media. Using a sound source, the first and second primary signals are emitted such that the first and second primary signals combine in a nonlinear fashion in the target granular media to produce low frequency acoustic tone that is a difference between the first and primary signals. An acoustic pulse is received by an acoustic receiver, and a quadratic nonlinearity coefficient and an acoustic pressure field are determined based on the acoustic pulse. At this stage, a sediment shear strength of the granular media is correlated to the quadratic nonlinearity coefficient to generate a shear strength lookup table.

20 Claims, 5 Drawing Sheets

(52) U.S. Cl.
CPC .... *G01S 15/8952* (2013.01); *G01V 2210/144* (2013.01); *G01V 2210/584* (2013.01); *G01V 2210/588* (2013.01)

(56) References Cited

U.S. PATENT DOCUMENTS

| | | | | |
|---|---|---|---|---|
| 6,343,513 | B1 * | 2/2002 | Yost | G01H 5/00 73/1.82 |
| 6,697,302 | B1 * | 2/2004 | Cray | H04R 1/44 367/141 |
| 8,116,167 | B2 * | 2/2012 | Johnson | G01V 1/46 367/32 |
| 8,550,998 | B2 * | 10/2013 | Angelsen | G01S 7/52095 600/437 |
| 8,793,079 | B2 * | 7/2014 | Angelsen | G01V 99/005 702/33 |
| 8,923,092 | B2 * | 12/2014 | Vu | G01V 1/44 367/32 |
| 10,024,990 | B2 * | 7/2018 | Lambert | G01V 1/168 |
| 10,136,876 | B2 * | 11/2018 | Guzina | A61B 8/485 |

OTHER PUBLICATIONS

B.N. Kim and S.W. Yoon, "Nonlinear parameter estimation in water-saturated sandy sediment with difference frequency acoustic wave", Ultrasonics 49, pp. 438-445, 2009.

* cited by examiner

ACOUSTIC SYSTEM AND METHOD FOR CHARACTERIZING GRANULAR MEDIA

BACKGROUND

The degree of nonlinearity in marine sediments indicates the proportion of defects within the sediment structure, which for sand sediments relates to grain roughness and angularity. For mud sediments nonlinearity relates to grain shape and electrostatic charge potential (grain roughness and angularity in sand and electrostatic charge and potential in mud are indicative of the geotechnical properties related to strength under directed stress).

Westervelt (1957) in Scattering Sound by Sound develops a mathematical description of the interaction two plane waves and argues that the resultant wave will form within the constraints of the two primaries and propagate along the same path such that the scattered waves will not be formed. Westervelt (1963) addresses the development of the difference frequency and the nature of the difference frequency with respect to columniation, coherence, and attenuation.

U.S. Pat. No. 3,613,069 describes a parametric acoustic method to use two transducers that are spaced at some distance apart to generate a long range directional sonar that has a highly directional beam. U.S. Pat. No. 3,786,402 describes a ship mounted parametric system that could be used to produce a low frequency sound source from two primary frequencies that are modulated within the slightly nonlinear medium of the water column and the highly nonlinear medium of the sediment. The proposed utility of this system would be to locate subsurface sediment layers, and objects, such as pipes, based upon the nature of the echoes.

U.S. Pat. No. 4,606,014 addresses the measurement of shear waves within a bore-hole that are generated by the production of two, out-of-phase compressional waves. The interaction of the positive and negative compressional waves will produce a shear wave in the surrounding earth material, which may be measured within the borehole. U.S. Pat. No. 4,703,462 addresses a mathematical method to determine the position of an object from the echo by removing filtering the echo returns to isolate the object and to determine the bearing. This is done virtually in order to avoid the complications of physically steering the acoustic beam.

U.S. Pat. No. 4,924,449 describes a seafloor mounted platform that is tethered to a ship that is used to collect acoustic data from water column and seafloor that houses an acoustic transmitter and receiver to isolate the geoacoustic properties of the seafloor. The platform is relocated into several other places so that data collected from all sites can be interpolated to provide the acoustic properties of the seabed fora given area. U.S. Pat. No. 5,559,754 addresses a backscatter processing technique that differentiates sediment types based upon echo strength in order to determine the bottom sediments acoustic reflection coefficient to infer density and sediment sound speed. This method uses a comparison chart or lookup table for sediments in the given area to determine the sediment physical properties.

U.S. Pat. No. 5,974,881 describes a parametric system used to detect buried objects, such as man-made mines by emitting one or more frequencies simultaneously to vibrate surface sediment from the acoustic return off of a compliant mine. U.S. Pat. No. 5,991,236 describes a linear acoustic system with an array of hydrophones used to collect backscatter data and to detect buried objects, such as man-made mines, determine geological formations and determine sediment geoacoustic properties, such as soundspeed and density, therefore impedance, but does not demonstrate how geotechnical properties may be inverted or inferred from the acoustic returns. U.S. Patent Pub. No. 2006/0225509 A1 addresses an acoustic method to detect buried objects and cracks within earthen materials across and air-earth interface.

These previous efforts provide the scope of use for parametric acoustic and linear acoustic determinations of sediment properties and some other materials. Numerous service agencies rely on determinations of seafloor sediment properties to make decisions regarding unexploded ordnance detection, mine burial potential, trafficability, shoaling potential, and sand borrow areas. These decisions are typically based on assessed, inferred, or implied geoacoustic, geotechnical, and geophysical properties over vast areas where direct sediment sampling and analysis is limited and very time consuming—additionally samples provide point measurements that require interpolation and extrapolation to develop predictive maps.

In view of the above, it is highly desirable to provide maps that are based upon full or at the least additional coverage, where the maps are completed rapidly due to access limitations and ship time allocations. Methods that utilize acoustics to infer and differentiate sediment types, strengths, and potential utility to the numerous service agencies that require them are also desirable.

SUMMARY

Embodiments relate to noncontact determination of nonlinearities. Initially, a first and second primary signal are preconditioned to produce a first and second tone capable of reaching a target granular media. Using a sound source, the first and second primary signals are emitted such that the first and second primary signals combine in a nonlinear fashion in the target granular media to produce low frequency acoustic tone that is a difference between the first and primary signals. An acoustic pulse is received by an acoustic receiver, and a quadratic nonlinearity coefficient and an acoustic pressure field are determined based on the acoustic pulse. At this stage, a sediment shear strength of the granular media is correlated to the quadratic nonlinearity coefficient to generate a shear strength lookup table.

DESCRIPTION

Embodiments of the invention relate to the generation of two high frequency acoustic beams that propagate through water, a slightly nonlinear medium, into and through a sediment, a highly nonlinear medium. A lower frequency pulse at the difference frequency of the two primaries is also emitted into the sediment. This lower frequency pulse and its properties are received by a hydrophone in near-field and far-field measurements within a matrix to determine beam coherence and to enable $\beta$ to be determined from the far-field data, where $\beta$ is the coefficient of nonlinearity within the Westervelt equation, which describes a method of producing sound from two different sound sources with higher frequencies.

The invention addresses the determination of the nonlinearity within the medium based upon the classic parametric equation, which was used to discern that the interaction of the acoustic pulse responds to small-scale variability within the sediment. In order to put this methodology into practice and to demonstrate a practical application, a separate measurement for the sand sediment, the sand shear strength, is determined according to Standard Test Method for Consolidated Undrained Direct Simple Shear Testing of Fine Grain Soils (ASTM D6528) so as to quantify the shear strength data that could be correlated with the acoustic nonlinearity of the sands. An additional determination for mud sediments also indicates that geotechnical properties of the mud may be correlated with the acoustic nonlinearity of the muds. The resultant methodology for determining acoustic nonlinearity and the established correlation with sand strengths demonstrates a potential field application of non-contact determination of sediment geotechnical properties. In the near term, this methodology is used to develop a set of look up tables that relate the quadratic nonlinearity coefficient ($\beta$) to sediment strength.

It has been discovered that $\beta$ can be determined from scattering of the difference frequency produced while operating a parametric acoustic system for a variety of water saturated sands and sediments. It has further been discovered that the offset distance for the acoustic receiver can be determined mathematically to provide a methodology for predicting the minimum proper offset between the acoustic source (i.e., the transducer) and the acoustic receiver (i.e., the hydrophone). It has further been discovered that the magnitude of $\beta$ can be related to the shape and properties of the sand sediments and to the mineralogy and electric potential of the mud.

Embodiments of the invention include several steps to determine the quadratic nonlinearity coefficient $\beta$ that is used to address nonlinearity in varied sediment types. The acoustic source is placed in the water and is conditioned with a set of amplifiers so that two intense high frequency pulses (P1 and P2) are produced. These high frequency pulses are directed to interact in such a way that they produce a low frequency signal (i.e., tone), the difference frequency (P1-P2). The frequencies of the primary and difference frequencies can vary depending upon the platform that is used and the desired depth of penetration. For example, primary frequencies can range from 10 kHz to 1.2 mHz, and difference frequencies can range from 1 to ~40 kHz.

The difference frequency is projected into the sediment such that the difference frequency passes out of the sediment and can be captured by the receiver. The received signals are passed to the computer and processed according to the Westervelt Equation to predict $\beta$ for each sediment type. The properties of the sediments used in each experiment are determined according to ASTM standards so that correlations can be drawn between the acoustic nonlinearity of the sediment ($\beta$) and the strength and strength determinants of the sediment.

Figure 1:
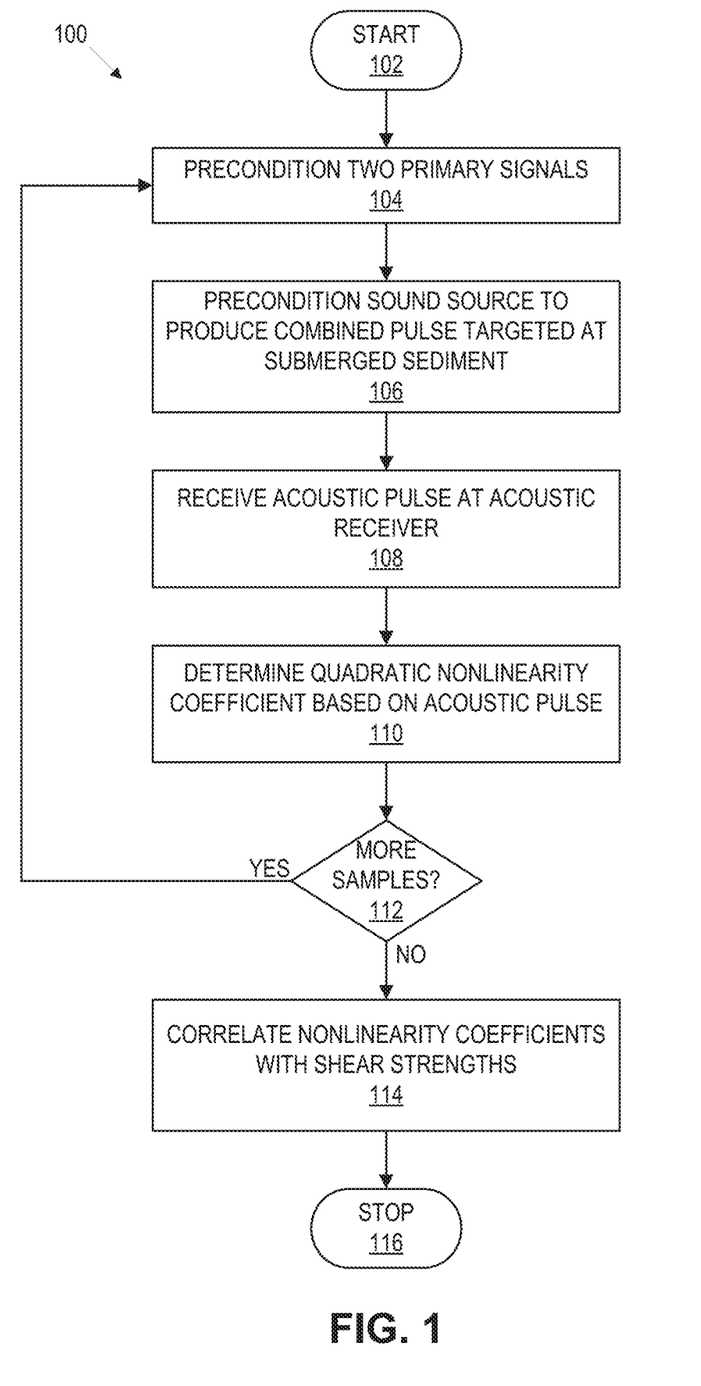
FIG. 1 is an example workflow for characterizing granular media.

FIG. 1 an example workflow 100 for characterizing granular media. As is the case with the other processes described herein, various embodiments may not include all of the steps described below, may include additional steps, and may sequence the steps differently. Accordingly, the specific arrangement of steps shown in FIG. 1 should not be construed as limiting the scope of characterizing granular media.

In block 102, the method starts and proceeds to block 104, where two primary signals are conditioned. The two primary signals are preconditioned to provide ample power so that the tones will readily propagate through the water and sediment to the source. In block 106, the sound source is preconditioned to produce a combined pulse targeted at submerged sediment. Specifically, the sound source is preconditioned to produce two acoustic tones that interact in a nonlinear way within the sand or marine sediment to produce a lower frequency acoustic tone (i.e., difference frequency) that has the potential to propagate through the sediments with less attenuation (over a longer distance) than the two primaries, which are attenuated much more readily. This configuration of sound source provides the advantage of using significantly smaller acoustic sources to produce the difference frequency, which typically requires a single, low frequency transducer that is much larger. The difference frequency thus produced provide a beam with a narrower width in which the side-lobes are essentially eliminated.

In block 108, the acoustic pulse is received at an acoustic receiver. The acoustic pulse can be transmitted or reflected. The pulse source and receiver are spaced apart so that an acoustic signal can pass through the sediment and be captured by the receiver, which may be a hydrophone, another transducer, or another piezoelectric device that has a good impedance match with water. The impendence match allows the receiver to effectively convert an acoustic pressure into an electronic signal.

The receiver can be placed in the near-field or the far-field depending on the type of information sought. The receiver can be positioned in select positions from the transmitter within the body of water to obtain a coherent signal, effectively being in the far-field so that the acoustic determinations are based upon a coherent signal where the sound pulse and sound particles are in phase and maximum propagation of sound is determined. The positioning in the far field within the body of water to obtain a coherent signal may provide information about the sediment that is below the diffraction limit. If evanescent information is sought within the pressure field, the positioning can also be configured for the near-field but without full coherence as described below with respect to FIG. 4.

The emitted sound that is required to determine $\beta$ may be captured in the near-field and/or far-field by a translatable receiver that records the sound at several positions in one or more three-dimensional arrays over several points in time, or by an array of receivers that records the sound in several locations at a single time, or by a single receiver at a single position in time.

In block 110, the captured acoustic signal is transferred to an electronic signal that is processed to obtain the pressure field, the attenuation, the sound speed, and $\beta$ (i.e., the quadratic nonlinearity coefficient). In this manner, acoustic sources can be tested in the laboratory on sand and marine sediments (or other material) to determine what standoff would be needed by the receiver to obtain a coherent signal.

In block 112, a determination is made as to whether there are additional samples to analyze. If there are additional samples to analyze, workflow returns to block 104 to process the next sample. If there are no more samples to process, each $\beta$ can be correlated to a shear strength of its corresponding sample in block 114. For example, a "Lookup Table" for a wide array of marine sediments (in support of HFEVA [High Frequency Environmental Acoustics] and MEDAL [Mine Warfare Decision Aid Library]) can be generated, where the marine sediments are relevant to naval operations for trafficability, mine warfare, and acoustic propagation potential, in order to predict the relative differences over a wide range of sediment bearing strengths or shear strengths, and transport potentials. In this example, the "Lookup Table" may be applied to swath mapping in harbors, bays, estuaries, and shallow water (0-200 m depth) in order to predict, for example, sediment strength, sediment transport potential, and mine burial potential based on β values that are determined in operational environments.

Figure 2:
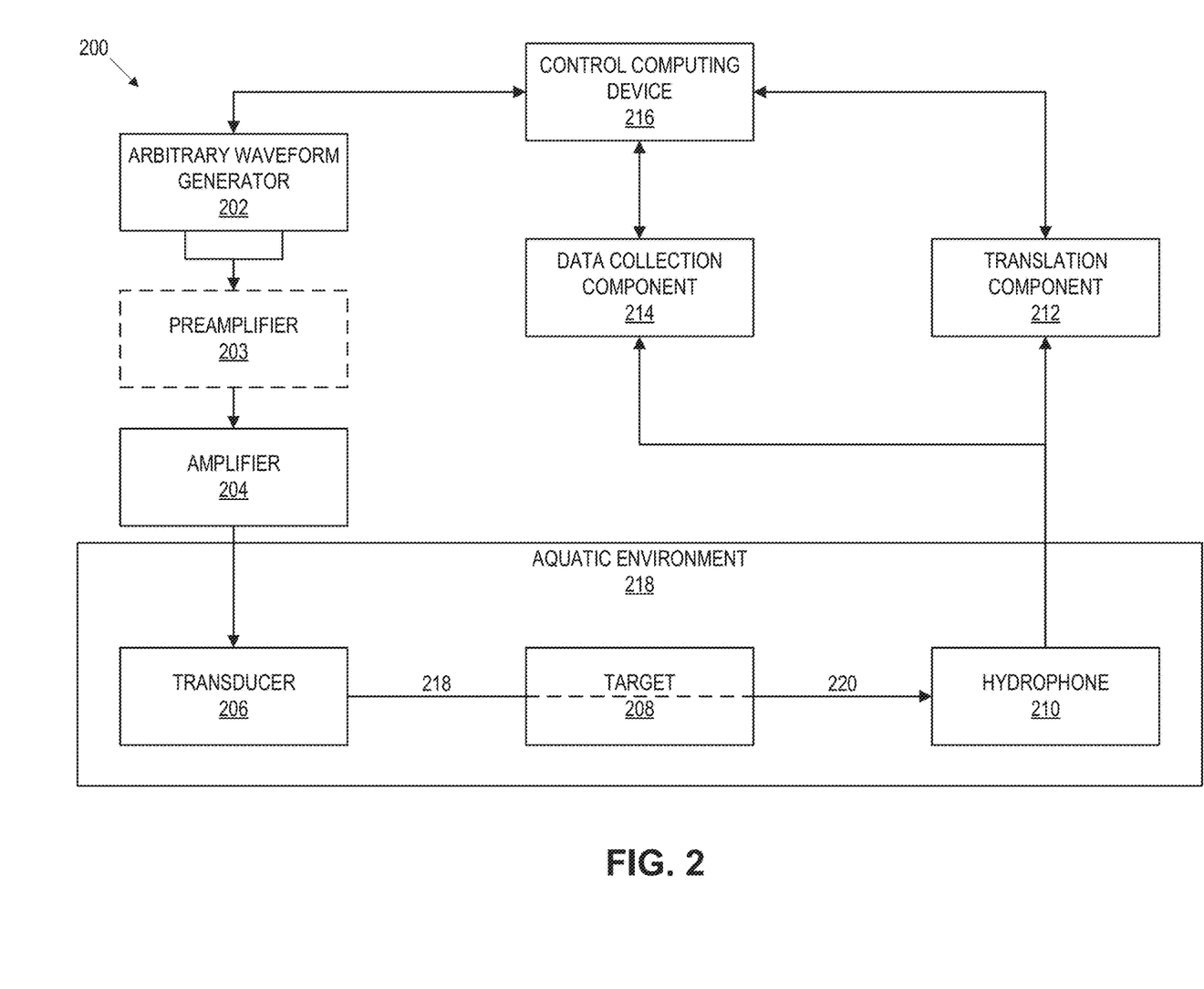
FIGS. 2-3 are example systems for characterizing granular media.

FIG. 2 is an example system 200 for characterizing granular media. The system 200 includes arbitrary waveform generator 202, amplifier(s) 204, transducer 206, target 208, hydrophone 210, translation component 212, data collection component 214, and control computing device 216. Optionally, system 200 can also include preamplifier(s) 203. Transducer 206, target 208, and hydrophone 210 are positioned within an aquatic environment 218. The arbitrary waveform generator 202 passes a waveform through the amplifier(s) 204 that enhance the power of the acoustic signal that is generated in the transducer 206 and is then passed through the aquatic environment 218 in the direction of the sediment target 208. In this example, a maximum response axis 220 is shown between target 208 and hydrophone 210. In some cases, preamplifier(s) 203 can be used to increase the power of the signal that is passed to the amplifier(s) 204.

Translation component 212 is configured to translate the captured acoustic signal is to an electronic signal for processing by control computing device 216. For example, control computing device 216 can use the translated electronic signal to determine β. Data collection component 214 is configured to collect signal data from the hydrophone 210. The signal data can then be used by control computing device 216 to determine various characteristics of the signal (e.g., the pressure field, the attenuation, the sound speed, etc.).

In some cases, the sediment target 208 could be placed on the bottom of the aquatic environment 218. In this configuration, tranducer 206 is positioned to fire downward toward sediment target 208 so that the sound beam 218 reflects off sediment target 208 and up towards hydrophone 210, which is positioned above sediment target 208.

System 200 is capable of determining the acoustic parameter for quadratic nonlinearity (β) within water-saturated sand. Specifically, results of the system 200 demonstrate the variability in β for a variety of naturally occurring sands with varied textures and shape—smooth and well rounded to rough and highly angular. System 200 is capable of quantifying β using an acoustic non-contact method to identify and differentiate water-saturated sands. Such determination will facility predictions of sediment shear strength and sand transport potential, which are key to predicting mine burial potential, unexploded ordinance exposure, bedform migration, and trafficability, etc.

System 200 can be used to generate a lookup table of β values for various types of sand with different shapes, shear strengths, and transport potentials that could be used in naval operations when running parametric acoustic systems as survey tools from single platforms or multiple platforms (i.e., autonomous underwater vehicle swarms).

Free field observation—transducer 206 is configured to generate a short (e.g., ~1 ms), intense pulse of sound that consists of two tones of constant magnitude and different frequencies. The resulting acoustic signal in the water (without the sediment sample in place) is observed throughout the field of the primary beams, from the face of the transducer to the end of the aquatic environment 218. A time series, relative to the pulse emission is observed for ~5 ms at a 200 kHz sample rate. A time series is stored for each point, and the stored time series can be compiled into a three-dimensional grid throughout the "downstream" portion of the aquatic environment 218 (i.e., from the target sediment box 208 to the hydrophone/receiver 210). From these data, the intensity of each primary signal can be estimated through Fourier decomposition.

Attenuation estimation—with the sediment sample in place at target 208, the pulse generated by transducer 206 can be generated to collect a set of time series. The field is observed directly behind the sample within a volume about the maximum response axis 220 of the beam 218. As with the free field data (i.e., no sample), the intensity of each primary signal is estimated through Fourier decomposition. Comparison to the free-field primary wave intensities allow for estimation of attenuation of the signal within the sediment sample 208.

Secondary signal observation—additionally, with the sediment sample 208 in place, the pulse generated by transducer 206 can be used to collect another set of time series. For this set, the field is observed farther behind the sample 208 within a volume about the maximum response axis 220 of the beam 218 in a region where the secondary signal is observable. From these data, the intensities of each primary signals as well as the difference frequency signal are estimated through Fourier decomposition.

Determination of quadratic parameter of nonlinearity (β)—β is given in terms of the ratio of the signal intensity of the difference frequency (from secondary signal observation) to the signal intensities of the incident primary (from free field observation), the attenuation within the sediment sample 208 (from attenuation estimation), and other known geoacoustic parameters (e.g., density).

System 200 is capable of physically measuring β in sands, which are comprised of different minerals with varied shapes and strengths. System 200 is also capable of measuring pressure field at near and far field with translational hydrophone 210. Significant diffraction occurs in the near-field, yet the full pressure pulse can still be captured. Signal coherence is good in the far-field because sound particle velocity is in phase with sound pressure.

Figure 3:
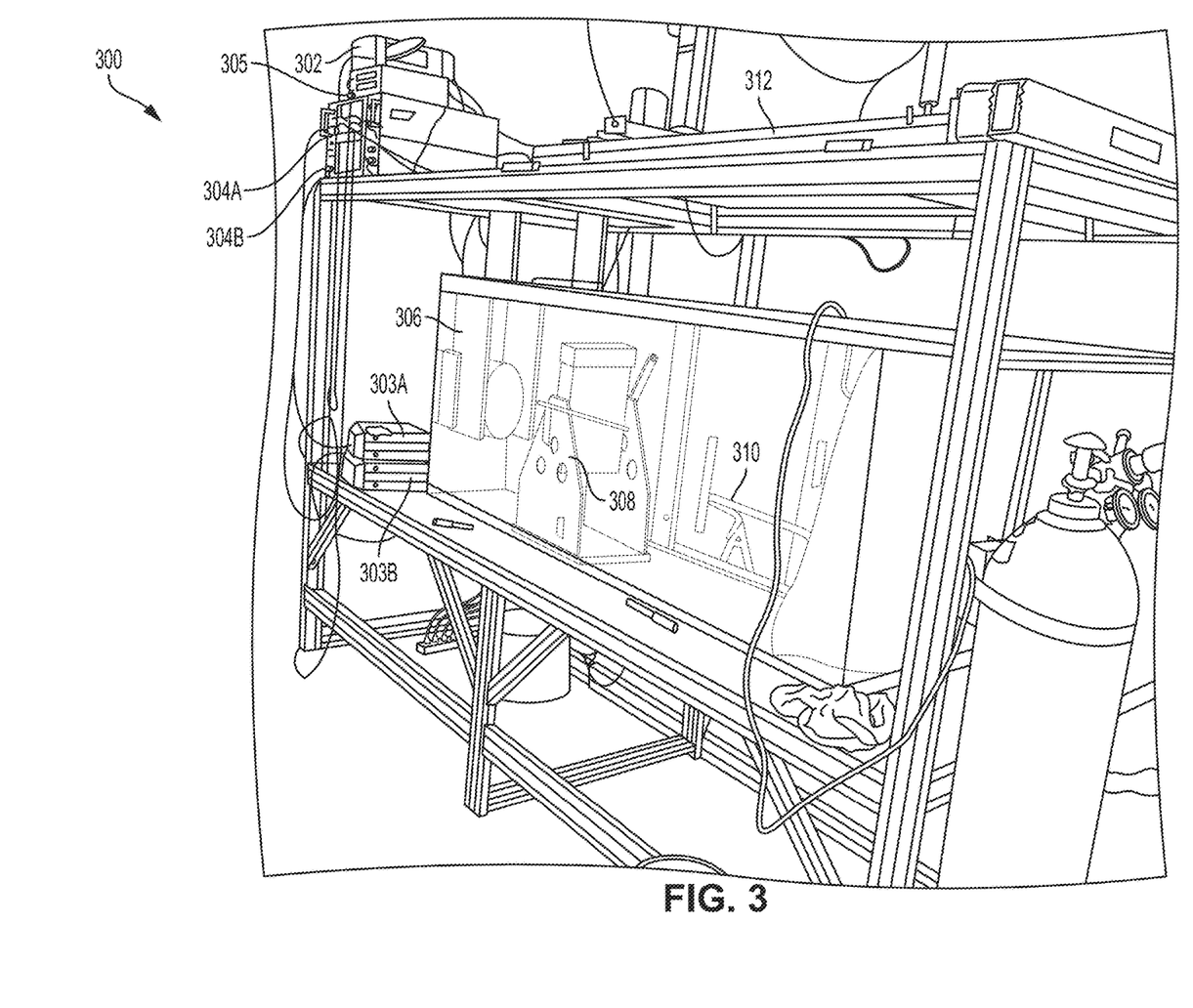

FIG. 3 is an example system 300 for characterizing granular media shown in a laboratory. Each of the components of system 300 corresponds to a component in system 200 of FIG. 2. System 300 shows how transducer 306, sediment target 308, and hydrophone 310 can be positioned within aquatic environment 318.

Figure 4:
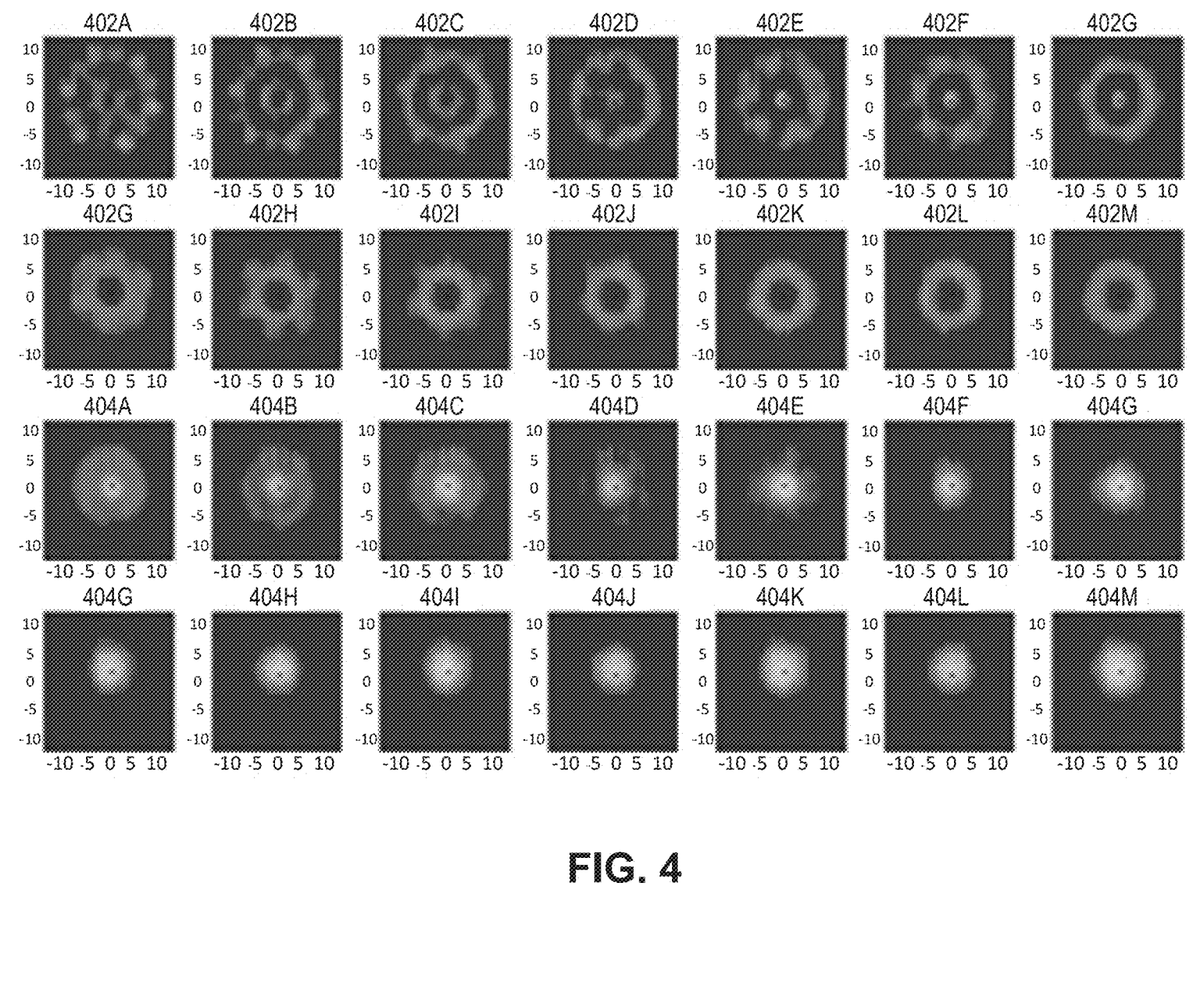
FIG. 4 shows example intensity measurements of a beam in near-field and far-field of a transducer.

FIG. 4 shows example intensity measurements of a beam in near-field 402A-402M and far-field 404A-404M of a transducer. Specifically, the observed intensities of a single 40 kHz gated signal of 10 ms duration observed throughout a volume of water in the immediate vicinity of the transducer are shown. Measurement 402A is for a plane parallel to the face of the transducer 3 cm from the face. Each subsequent image 402B-402G is 1 cm farther away, and each is sampled a1 1 cm×1 cm resolution, where the intensity of all images are relative to the maximum observed (yellow is the most intense, dark blue is the least). Measurements 402H-402M are similarly positioned between 14 and 19 cm from the transducer. Measurements 402A-402M clearly indicate that diffraction effects are significant, and intensity variations throughout the volume should be considered. Erroneously assuming constant amplitude primaries (as in previous methods) overestimates the intensity of the primaries, and therefore underestimates β. Embodiments of the invention directly observe the intensity of the primary signals to provide a more realistic model of parametric interactions in the near-field of the transducer and, thus, a more accurate estimate of β.

The far-field measurements 404A-404M (ranging from 24 cm to 39 cm) show a coherent signal where the sound pulse and sound particles are in phase and only propagation of sound is determined.

Historical methodologies assumed the intensity of the primary acoustic tones is constant within the acoustic field where the observations are made. This assumption neglects diffraction, which can be significant. Embodiments of the invention address this issue by having the hydrophone mounted on a 3D translation system, which allows for detailed and repeatable observation of the intensity acoustic field for both the primary and secondary acoustic tones. This ability to scan the acoustic field for variations in tone intensity provides a means to correct for diffraction, which is required in order to properly determine the primaries and enable β to be properly estimated for each of the different sand sediments. When the scanning procedure is not performed as described, the primaries are overestimated and β is underestimated.

Embodiments of the invention directly observe the intensity of the primary signals over a wide volume to capture the near-field acoustics. Accordingly, the methods described herein provide a realistic model of parametric interactions in near-field of the transducer and, thus, a more accurate estimate of β.

Figure 5:
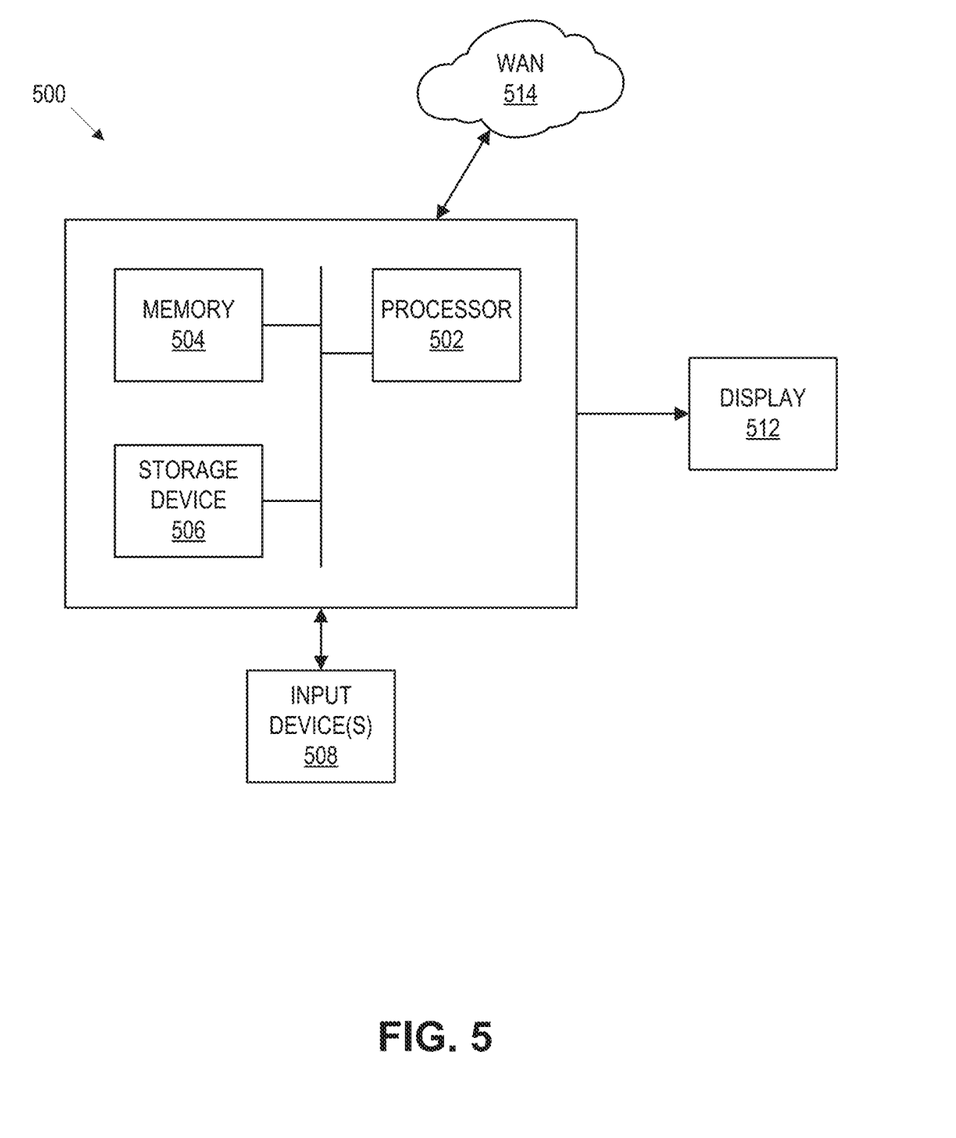
FIG. 5 is a diagram of an example computer system for characterizing granular media.

Components of the invention may be implemented on virtually any type of computer regardless of the platform being used. For example, as shown in FIG. 5, a computer system 500 includes a processor 502, associated memory 504, a storage device 506, and numerous other elements and functionalities typical of today's computers (not shown). The computer 500 may also include input means 508, such as a keyboard and a mouse, and output means 512, such as a monitor. The computer system 500 may be connected to a local area network (LAN) or a wide area network (e.g., the Internet) 514 via a network interface connection (not shown). Those skilled in the art will appreciate that these input and output means may take other forms.

Further, those skilled in the art will appreciate that one or more elements of the aforementioned computer system 500 may be located at a remote location and connected to the other elements over a network. Further, the invention may be implemented on a distributed system having a plurality of nodes, where each portion of the invention (e.g., control computing device, data collection component, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An acoustic system, comprising:
 a transducer configured to:
  generate an acoustic signal,
  transmit the acoustic signal through water without a sediment sample, thereby generating a free field acoustic signal,
  transmit the acoustic signal through the sediment sample, thereby causing the acoustic signal to be modified into a modified acoustic signal;
 a receiver configured to:
  receive the modified acoustic signal,
  record sound from the modified acoustic signal at a plurality of locations in a plurality of points in time, thereby generating first recorded sound,
  receive the free field acoustic signal,
  record sound from the free field acoustic signal, thereby generating second recorded sound; and
 a controller configured to:
  determine a first signal intensity of the first recorded sound,
  determine a second signal intensity of the second recorded sound, and
  determine a quadratic nonlinearity coefficient of the sediment based on the first signal intensity and the second signal intensity.

2. The acoustic system of claim 1, further comprising:
 a waveform generator configured to generate a waveform, wherein the transducer is configured to:
 receive the waveform, and
 generate the acoustic signal based on the waveform.

3. The acoustic system of claim 2, further comprising:
 an amplifier coupled to the waveform generator, wherein the amplifier is configured to:
 amplify the waveform, and
 transmit an amplified waveform to the transducer.

4. The acoustic system of claim 1, wherein the transducer is located in an aquatic environment.

5. The acoustic system of claim 1, wherein the acoustic signal comprises a pulse of sound comprising two tones of constant magnitude, and wherein the two tones have different frequencies.

6. The acoustic system of claim 5, wherein the two tones are configured to interact in a nonlinear way with sand or marine sediment to produce a difference frequency acoustic tone that propagates the through the sediment with less attenuation than frequencies of the two tones.

7. The acoustic system of claim 1, wherein the receiver is a hydrophone.

8. The acoustic system of claim 1, further comprising: a translator configured to translate the modified acoustic signal into an electronic signal; and send the electronic signal to the controller.

9. The acoustic system of claim 8, wherein the translator is further configured to:
 determine a pressure field of the modified acoustic signal;
 determine an attenuation of the modified acoustic signal; and
 determine a sound speed of the modified acoustic signal.

10. The acoustic system of claim 1, wherein the receiver is further configured to receive a plurality of modified acoustic signals and to record sound from a plurality of modified acoustic signals, thereby generating a plurality of recorded sound samples, and wherein the controller is further configured to determine a plurality of quadratic nonlinearity coefficients for a plurality of sediment types based on respective recorded sound samples in the plurality of recorded sound samples.

11. The acoustic system of claim 10, wherein the controller is further configured to generate a lookup table for the plurality of sediment types based on the plurality of quadratic nonlinearity coefficients.

12. The acoustic system of claim 11, wherein the controller is further configured to generate the lookup table based on a plurality of shear strengths for the plurality of sediment types.

13. The acoustic system of claim 11, wherein the controller is further configured to generate the lookup table based on a plurality of shapes of the sediment types.

14. The acoustic system of claim 11, wherein the controller is further configured to generate the lookup table based on a plurality of transport potentials of the sediment types.

15. The acoustic system of claim 1, wherein the controller is further configured to determine a signal intensity of a difference frequency in the first recorded sound.

16. The acoustic system of claim 1, wherein the controller is further configured to determine the quadratic nonlinearity coefficient based on attenuation within the sediment sample.

17. The acoustic system of claim 1, wherein the receiver is further configured to record sound from a first sample of the modified acoustic signal and a second sample of the modified acoustic signal, and wherein the second sample is behind the first sample in an acoustic pressure field.

18. The acoustic system of claim 17, wherein the controller is further configured to determine the quadratic nonlinearity coefficient based on respective signal intensities of the first sample and the second sample.

19. An acoustic system, comprising:
   a transducer configured to:
     generate an acoustic signal,
       transmit the acoustic signal through water without a sediment sample, thereby generating a free field acoustic signal,
       transmit the acoustic signal through the sediment sample, thereby causing the acoustic signal to be modified into a modified acoustic signal;
   a receiver configured to:
     receive the modified acoustic signal,
     record sound from a first sample of the modified acoustic signal at a plurality of locations in a plurality of points in time, thereby generating first recorded sound,
     record sound from a second sample of the modified acoustic signal at a plurality of locations in a plurality of points in time, thereby generating second recorded sound, wherein the second sample is behind the first sample in an acoustic pressure field,
     receive the free field acoustic signal,
     record sound from the free field acoustic signal, thereby generating third recorded sound; and
   a controller configured to:
     determine a first signal intensity of the first recorded sound,
     determine a second signal intensity of the second recorded sound,
     determine a third signal intensity of the third recorded sound, and
     determine a quadratic nonlinearity coefficient of the sediment based on the first signal intensity, the second signal intensity, and the third signal intensity.

20. A system for determining a quadratic nonlinearity coefficient, the system comprising:
   a receiver configured to:
     receive a modified acoustic signal transmitted through a sediment sample,
     record sound from the modified acoustic signal at a plurality of locations in a plurality of points in time, thereby generating first recorded sound,
     receive a free field acoustic signal transmitted through water without the sediment sample,
     record sound from the free field acoustic signal, thereby generating second recorded sound; and
   a controller configured to:
     determine a first signal intensity of the first recorded sound,
     determine a second signal intensity of the second recorded sound, and
     determine a quadratic nonlinearity coefficient of the sediment based on the first signal intensity and the second signal intensity.

* * * * *